(12) United States Patent
Buddhiraju et al.

(10) Patent No.: US 11,656,464 B2
(45) Date of Patent: May 23, 2023

(54) LAYERED PUPIL-REPLICATING WAVEGUIDE

(71) Applicant: Meta Platforms Technologies, LLC, Menlo Park, CA (US)

(72) Inventors: Siddharth Buddhiraju, Redwood, WA (US); Hee Yoon Lee, Kirkland, WA (US); Pasi Saarikko, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 45 days.

(21) Appl. No.: 17/203,056

(22) Filed: Mar. 16, 2021

(65) Prior Publication Data
US 2022/0214548 A1   Jul. 7, 2022

Related U.S. Application Data

(60) Provisional application No. 63/133,716, filed on Jan. 4, 2021.

(51) Int. Cl.
*G02B 27/01* (2006.01)
*F21V 8/00* (2006.01)

(52) U.S. Cl.
CPC ....... *G02B 27/0172* (2013.01); *G02B 6/0016* (2013.01); *G02B 6/0035* (2013.01); *G02B 6/0056* (2013.01); *G02B 2027/0112* (2013.01)

(58) Field of Classification Search
CPC .............. G02F 1/0063; G02B 27/0172; G02B 2027/0112; G02B 6/0035; G02B 6/0056
See application file for complete search history.

(56) References Cited

U.S. PATENT DOCUMENTS

| 2016/0116739 | A1 | 4/2016 | TeKolste et al. |
| 2018/0164627 | A1 | 6/2018 | Oh |
| 2019/0339448 | A1* | 11/2019 | Shipton .............. G02B 27/1006 |
| 2021/0302738 | A1* | 9/2021 | Calafiore ................. G02B 6/28 |

FOREIGN PATENT DOCUMENTS

| WO | 2017083159 A1 | 5/2017 | |
| WO | WO-2021112982 A1 * | 6/2021 | ......... G02B 27/0172 |

OTHER PUBLICATIONS

International Search Report and Written Opinion for International Application No. PCT/US2022/011152, dated Apr. 20, 2022, 11 pages.

* cited by examiner

*Primary Examiner* — Thomas A Hollweg
*Assistant Examiner* — Mary A El-Shammaa
(74) *Attorney, Agent, or Firm* — Pequignot + Myers; Matthew A. Pequignot

(57) ABSTRACT

A pupil-replicating waveguide includes a high-index substrate and a low-index substrate coupled by an intermediate layer between the substrates. The refractive index of the intermediate layer is lower than the refractive index of the low-index substrate. The intermediate layer prevents highly oblique rays of image light from entering the low-index substrate, thereby reducing intensity drops in the field of view conveyed by the pupil-replicating waveguide, the intensity drops caused by insufficient replication of the highly oblique rays in the low-index substrate.

20 Claims, 19 Drawing Sheets

Anisotropic LC film with $n_o = 1.5$, $n_e = 1.7$

Red Color Channel

Green Color Channel

Blue Color Channel

Anisotropic LC film with $n_o = 1.5$, $n_e = 1.65$

Red Color Channel

Green Color Channel

Blue Color Channel

LAYERED PUPIL-REPLICATING WAVEGUIDE

REFERENCE TO RELATED APPLICATION

This application claims priority form U.S. Provisional Application No. 63/133,716, entitled "Layered Pupil-Replicating Waveguide", filed on Jan. 4, 2021, and incorporated herein by reference in its entirety.

TECHNICAL FIELD

The present disclosure relates to optical devices, and in particular to optical waveguides and waveguide-based visual displays.

BACKGROUND

Visual displays are used to provide information to viewer(s), the information including still images, video, data, etc. Visual displays have applications in diverse fields including entertainment, education, engineering, science, professional training, advertising, to name just a few examples. Some visual displays, such as TV sets, display images to several users, and some visual display systems, such as head-mounted displays (HMDs), are intended for individual users.

An artificial reality system generally includes a near-eye display (e.g., a headset or a pair of glasses) configured to present content to a user. A near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by seeing through a "combiner" component. The combiner of a wearable heads-up display is typically transparent to environmental light but includes some light routing optic to direct the display light into the user's field of view.

Compact and efficient display devices are desired for head-mounted near-eye displays. Because a display of HMD or NED is usually worn on the head of a user, a large, bulky, unbalanced, and/or heavy display device would be cumbersome and may be uncomfortable for the user to wear. Compact and efficient display devices require compact and efficient light sources, image projectors, waveguides, focusing and redirecting optics, etc.

BRIEF DESCRIPTION OF THE DRAWINGS

Exemplary embodiments will now be described in conjunction with the drawings, in which:

(FIG. 11B);

DETAILED DESCRIPTION

Figure 1A:
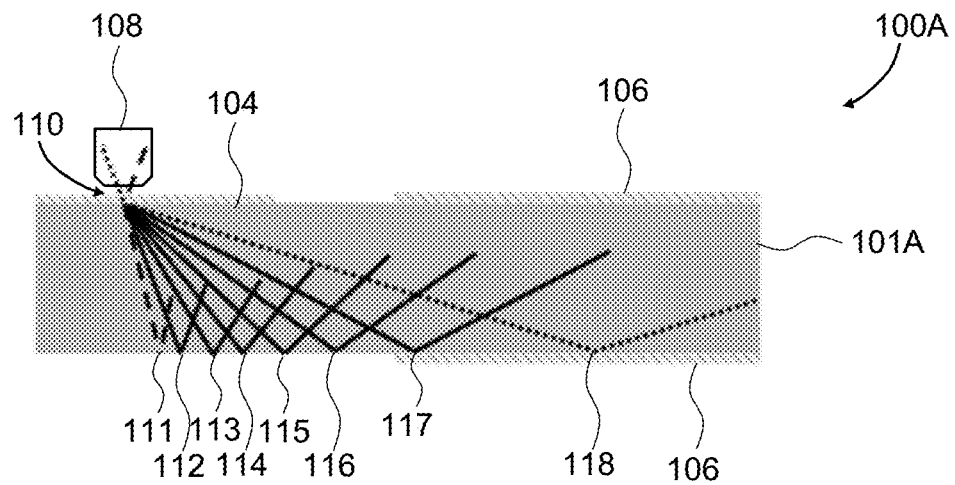
FIGS. 1A and 1B are side cross-sectional views of near-eye displays based on single-substrate and dual-substrate waveguides, respectively.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

A pupil replication density of a waveguide for conveying an image in angular domain to an eyebox of a near-eye display depends on the wavelength and beam angle of the light beam propagating in the waveguide. The wavelength and beam angle dependencies of pupil replication density and associated illumination non-uniformity may be lessened by providing a waveguide having two coupled substrates, or thick layers, of different refractive indices. A light beam that would be replicated too densely in a single-substrate waveguide will propagate in the second, lower-index substrate of a two-substrate waveguide, which lowers the replication density for that light beam. When light rays coupled into the lower-index substrate propagate at oblique angles, the replication density for the light rays can turn out to be too low. This may result in the illumination suddenly dropping at certain angles of incidence, causing non-uniformities in specific portions of the field of view of the image being conveyed.

In accordance with the present disclosure, an intermediate layer may be provided between two substrates of a dual-substrate pupil-replicating waveguide. The intermediate layer prevents highly oblique rays from propagation in the lower-index substrate, redirecting them to propagate in the higher-index substrate instead, which reduces illumination non-uniformities. The intermediate layer may have a refractive index lower than the lowest refractive index of the two substrates. The intermediate layer may be birefringent, and/or may include a reflective coating, e.g. a multilayer reflective coating. In some embodiments, the lower-index substrate may be birefringent, which may also improve the illumination uniformity.

In accordance with the present disclosure, there is provided a pupil-replicating waveguide comprising a first substrate having a first thickness and a first refractive index, a second substrate having a second thickness and a second refractive index lower than the first refractive index, and an intermediate layer between the first and second substrates. The intermediate layer optically couples the first and second substrates along length and width dimensions of the first and second substrates. A thickness of the intermediate layer is smaller than the first and second thickness. A refractive index of the intermediate layer is lower than the second refractive index. The thickness of the intermediate layer may be small enough to prevent zigzag light propagation in the intermediate layer, e.g. less than 10 micrometers. The thickness of the intermediate layer may be big enough to prevent evanescent coupling between the first and second substrates, e.g. at least 0.5 micrometers. In some embodiments, the refractive index of the intermediate layer is no greater than the second refractive index multiplied by)$\sin(75°)$. The first substrate, the intermediate layer, and the second substrate may be bonded to one another, forming a stack.

In some embodiments, the intermediate layer comprises a birefringent film comprising a first polarization refractive index for light at a first polarization and a second polarization refractive index for light at a second polarization, wherein the first and second polarizations are orthogonal to each other. The first polarization refractive index may be e.g. no greater than the second refractive index multiplied by $\sin(75°)$, and the second polarization refractive index may be e.g. between the second refractive index multiplied by $\sin(60°)$ and the second refractive index multiplied by $\sin(75°)$.

In some embodiments, the intermediate layer comprises an optical coating. The multilayer dielectric film may be configured to reflect rays of visible light propagating from the first substrate into the second substrate at angles of incidence at the multilayer dielectric film greater than 30 degrees. The pupil-replicating waveguide may further include an in-coupling grating supported by the first substrate, and one or two out-coupling gratings supported by the first substrate.

In accordance with the present disclosure, there is provided a pupil-replicating waveguide comprising a first substrate having a first refractive index and a second substrate comprising a birefringent material having both ordinary and extraordinary refractive indices smaller than the first refractive index. The first and second substrates are optically coupled along length and width dimensions of the first and second substrates. An optic axis of the birefringent material may be parallel to the second substrate. The first and second substrates may be bonded to each other, forming a stack.

In accordance with the present disclosure, there is further provided a near-eye display comprising a projector having an output pupil for providing image light carrying an image in angular domain, and a pupil-replicating waveguide of this disclosure optically coupled to the projector for replicating the output pupil by providing multiple portions of the image light offset relative to one another in at least one of length or width dimensions of the pupil-replicating waveguide.

Referring now to FIG. 1A, a single-substrate pupil-replicating waveguide 100A includes a substrate 101A supporting an input grating 104 for in-coupling image light 110 emitted by an image projector 108, and output gratings 106 for out-coupling portions of the image light 110 along the substrate 101A. The light 110 includes a plurality of rays 111, 112, 113, 114, 115, 116, 117, and 118 at different angles of incidence corresponding to different portions of field of view (FOV) of the image in angular domain being carried by the image light 110. The first ray 111, shown in dashed lines, is the least oblique marginal ray, and the eighth ray 118, shown in dotted lines, is the most oblique marginal ray. As can be gleaned from FIG. 1A, the pupil replication densities of the first 111 and the eighth 118 rays are quite different: while the first ray 111 will undergo many reflections between the input 104 and output 106 gratings and thus will be replicated many times, the eighth ray 118 will only undergo a single replication, causing a brightness of the image to be non-uniform.

Figure 1B:
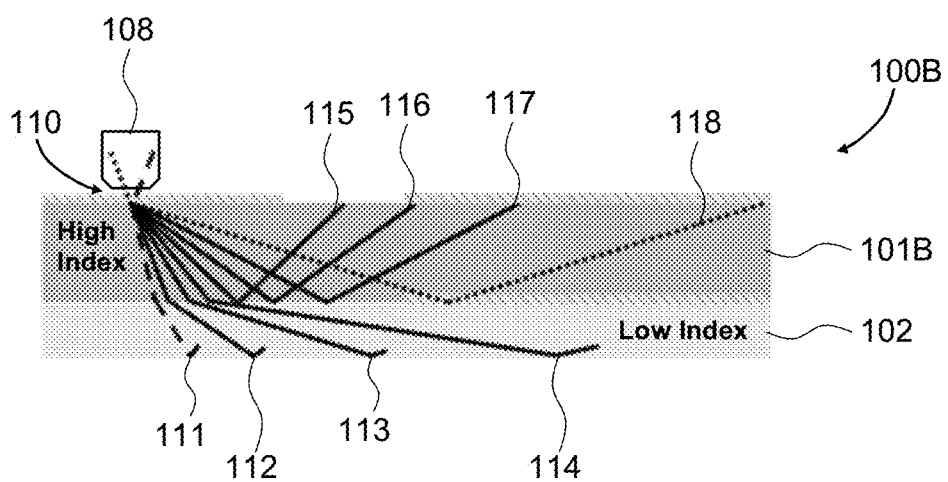

The brightness uniformity may be improved by coupling a second substrate 102 to a first substrate 101B, as shown in FIG. 1B, forming a dual-substrate pupil-replicating waveguide 100B. The second substrate 102 has a lower refractive index than the first substrate 101B, causing less oblique first 111 to fourth 114 rays to propagate in the second substrate 102. Due to the Snell's law of refraction, the oblique first 111 to fourth 114 rays have more oblique angles of propagation in the second substrate 102, reducing their replication density; and the more oblique fifth 115 to eighth 118 rays will propagate in the first substrate 101B, which can be made thinner than the substrate 101A shown in FIG. 1A, thereby increasing the replication density for these rays. The overall effect is that the pupil replication density becomes more uniform for different rays 111-118 of the image light 110. The rays 111-118 of FIG. 1A are shown truncated before they reach the out-coupling gratings 106, for clarity of the picture.

Figure 2A:
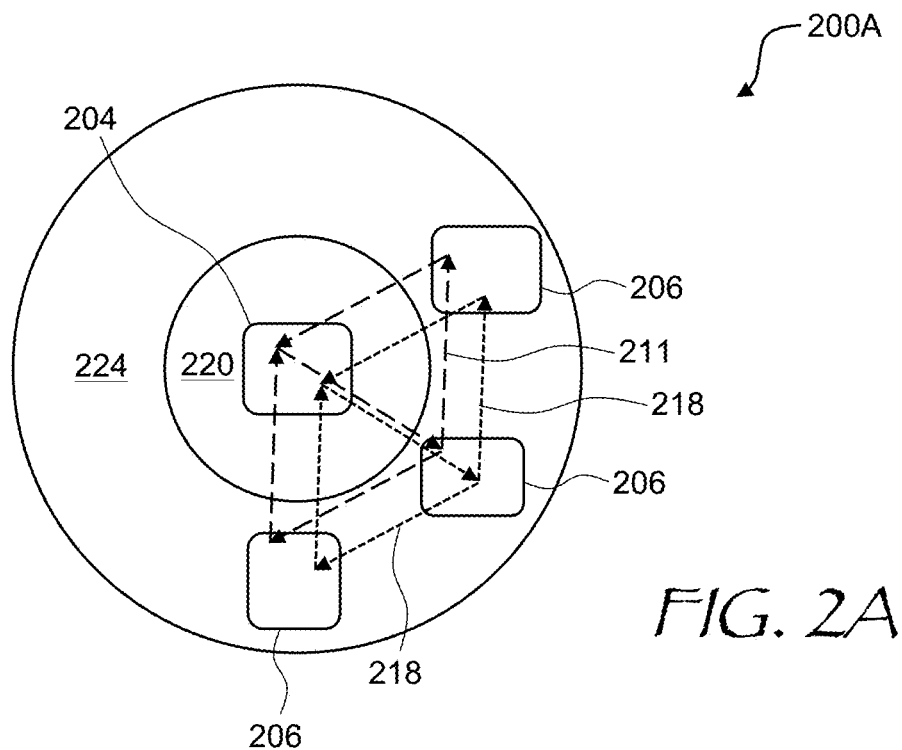
FIGS. 2A and 2B are k-vector diagrams for the near-eye displays of FIGS. 1A and 1B, respectively.

Referring to FIG. 2A with further reference to FIG. 1A, a k-vector diagram 200A illustrates the propagation of the image light 110 in the single-substrate pupil-replicating waveguide 100A of FIG. 1A. The k-vector diagram 200A of FIG. 2A includes an inner circle 220 corresponding to the refractive index of air, and a donut 224 corresponding the refractive index of the substrate 101A of FIG. 1A. First k-vectors 211 (FIG. 2A), shown in dashed lines, describe diffraction of the first ray 111 on the input grating 104 and the output grating 106, and eighth k-vectors 218, shown in dotted lines, describe diffraction of the eighth ray 118 on the in-coupling 104 and the out-coupling 106 gratings. The wave vectors corresponding to remaining rays 112-117 of FIG. 1A have been omitted for clarity. A first rectangular shape 204 denotes the FOV of the projector 108. Second rectangular shapes 206 correspond to angular ranges of rays diffracted by the out-coupling gratings 106.

Figure 2B:
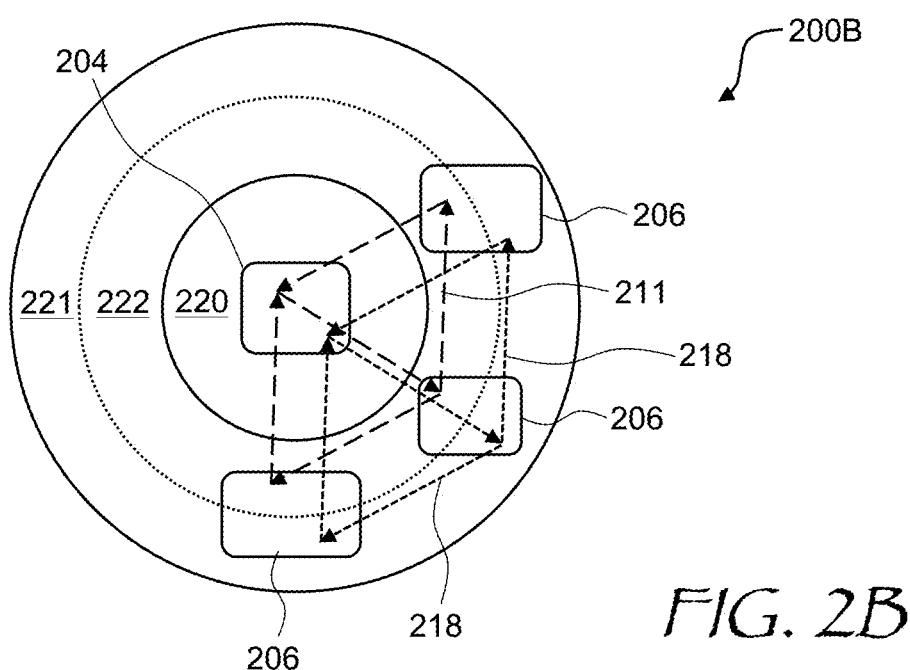

Turning to FIG. 2B with further reference to FIG. 1B, a k-vector diagram 200B describes propagation of the image light 110 in the dual-substrate pupil-replicating waveguide 100B of FIG. 1B. The k-vector diagram 200B of FIG. 2B includes an inner circle 220 corresponding to the refractive index of air, a first donut 221 corresponding to the refractive index of the first substrate 101B, and a second donut 222 corresponding to the refractive index of the second substrate 102 smaller than the refractive index of the first substrate 101B. The first k-vector 211 ends in the second donut 222, which corresponds to the first ray 111 propagating in the second substrate 102 (FIG. 1B). The eighth k-vector 218 ends in the first donut 221, which corresponds to the eighth ray 118 propagating in the first substrate 101B.

Figure 3:
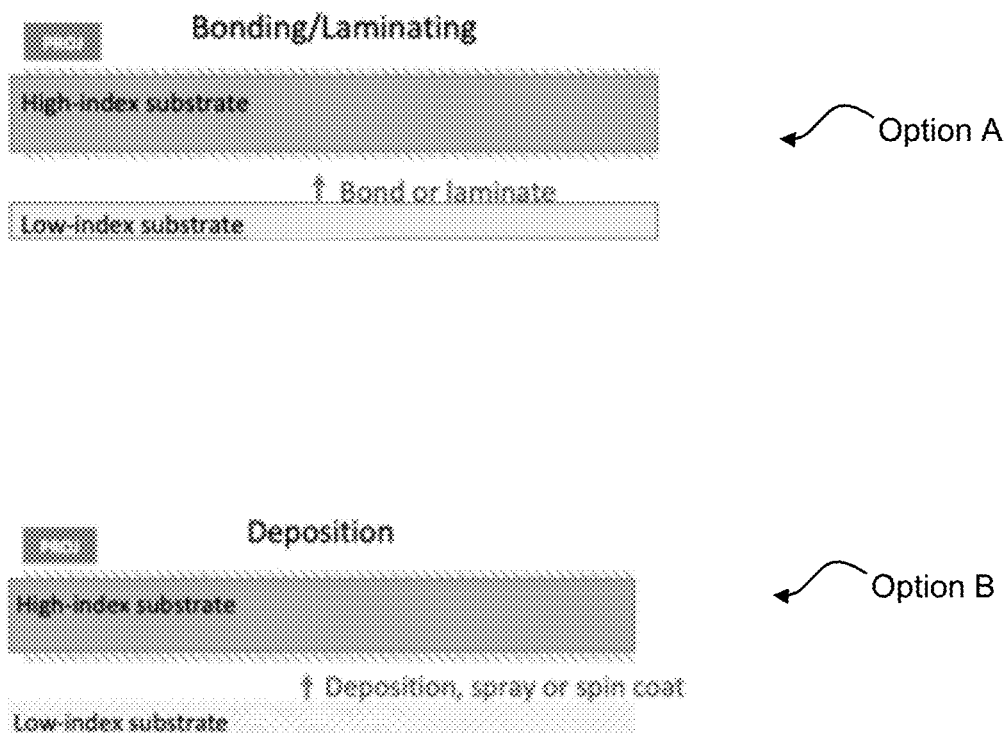
FIG. 3 is a cross-sectional exploded view of two variants of the waveguide of FIG. 1B illustrating methods of their manufacture.

Referring to FIG. 3, the second substrate 102 may be bonded to or laminated onto the first (high-index) substrate 101B (option A) or, alternatively, the second (low-index) substrate 102 may be deposited, sprayed, or spin-coated onto the first substrate 101B (option B). In FIG. 3, the box labeled "PROJ" denotes a projector that provides image light to the high-index substrate, which has the refractive index (RI) of 2.2 to 2.9 in this example. The low-index substrate has the RI of between 1.5 and 1.7. In some embodiments, the low-index substrate may be birefringent and have two indices of refraction, an ordinary RI and extraordinary RI, for light at two orthogonal polarizations. For example, the ordinary RI may be equal to 1.5, and the extraordinary RI may be equal to 1.7. Stacked waveguides with a birefringent layer will be considered further below.

Figure 4:
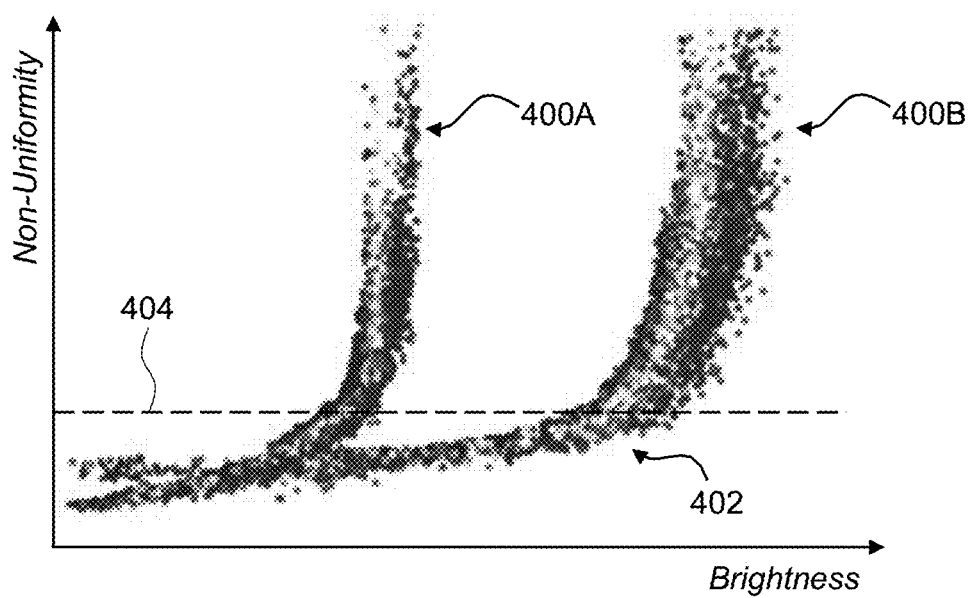
FIG. 4 is a combined plot of illumination non-uniformity vs. display brightness for the near-eye displays of FIGS. 1A and 1B.

Referring now to FIG. 4, a brightness non-uniformity 400A is plotted against brightness for the near-eye display 100A of FIG. 1A, i.e. the one having a single-substrate waveguide. A brightness non-uniformity plot for the near-eye display 100B of FIG. 1B, i.e. the one having a dual-substrate waveguide, is shown at 400B. Each dot in the graphs of FIG. 4 corresponds to a particular configuration of waveguide and gratings. From the viewpoint of waveguide optimization, it is desirable to increase the image brightness, i.e. move to the right in the graph of FIG. 4, while reducing the non-uniformity of the brightness, i.e. remaining low vertically in FIG. 4. One can see by comparing the plots 400A and 400B that the introduction of a second waveguide substrate enables one to significantly increase the overall brightness of the displayed image in an area 402 of the brightness non-uniformity plot 400B for the near-eye display 100B, while keeping the non-uniformity under a threshold value 404.

Figure 5:
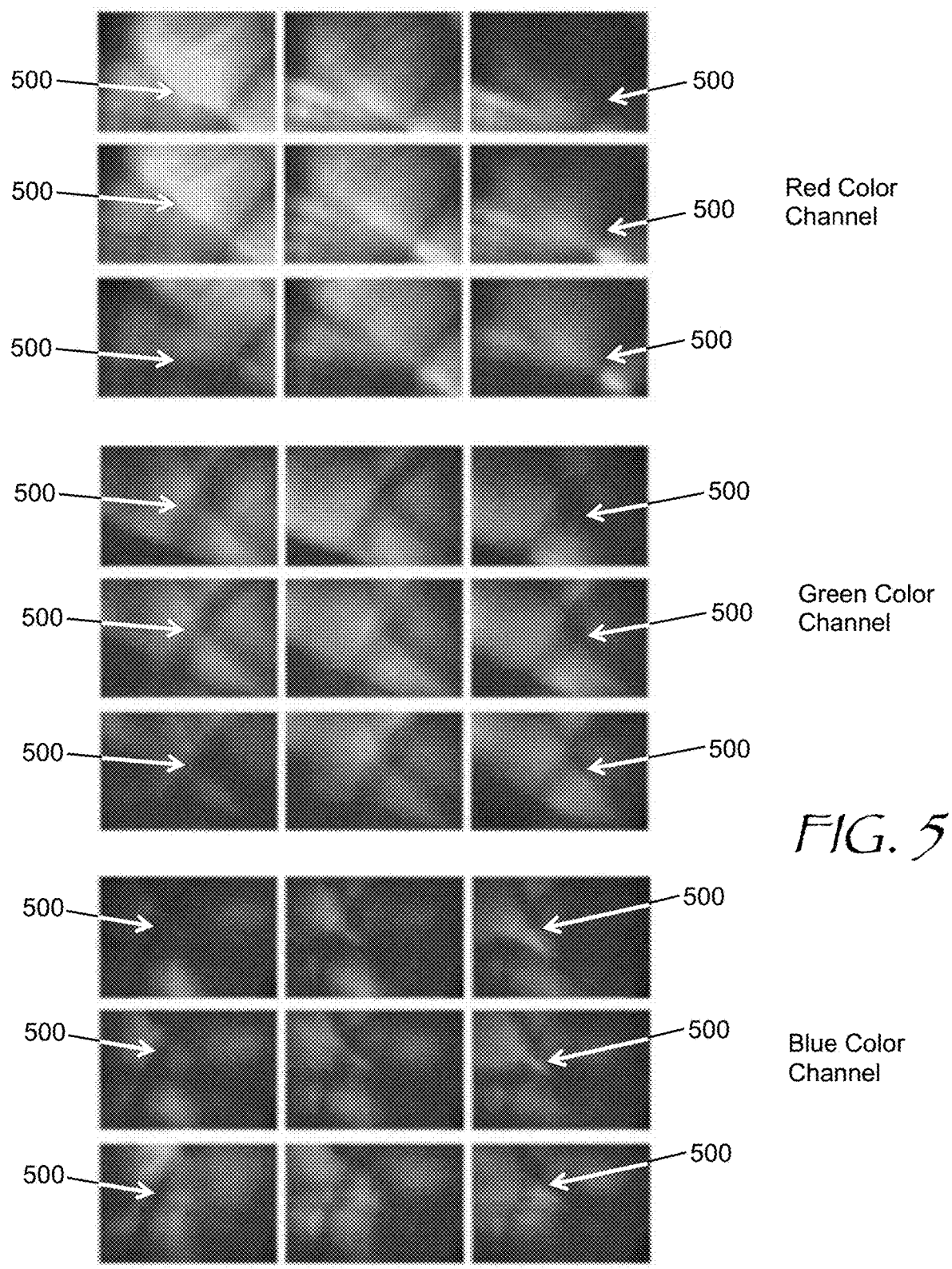
FIG. 5 is a set of illumination maps at nine different eyebox locations for each of red, green, and blue color channels for the near-eye display of FIG. 1B, illustrating a dark band problem.

While the dual-substrate waveguides may improve overall brightness of the displayed image, other non-uniform patterns may appear that are associated with the dual-substrate structure of the waveguide. In FIG. 5, a set of illumination maps at nine different eye pupil locations in the eyebox is presented for red (R), green (G), and blue (B) color channels of the image light. FOV maps at most locations at the eyebox show cross-shaped patterns 500, especially for green and blue channels. The cross-shaped patterns 500 may significantly reduce overall brightness uniformity of the viewed image.

Figure 6:
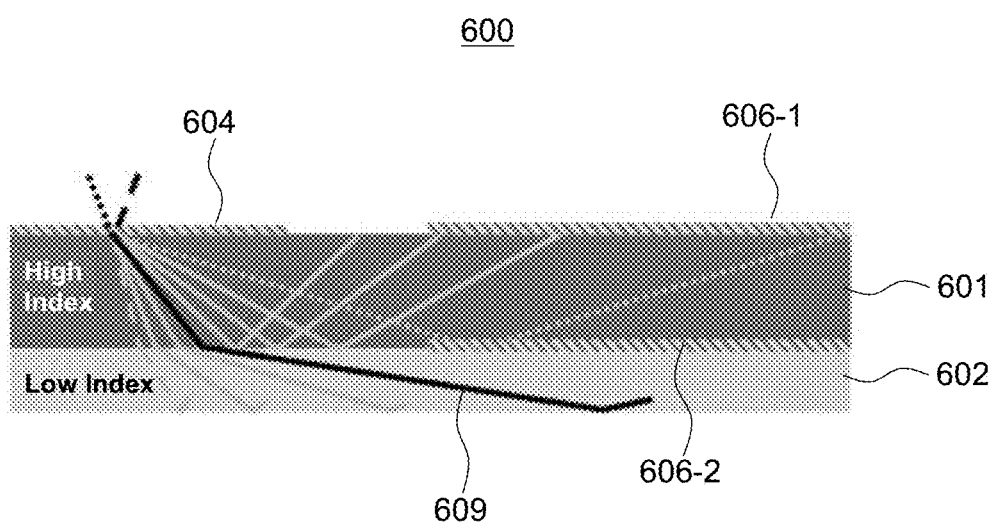
FIG. 6 is a side cross-sectional view of the dual-substrate waveguide of FIG. 1B showing oblique rays in the lower refractive index substrate causing the appearance of dark bands in the illumination maps of FIG. 5.

The origin of the cross-shaped non-uniformity patterns is illustrated in FIG. 6 showing a dual-substrate waveguide 600 having optically coupled first (high-index) 601 and second (low-index) 602 substrates, an in-coupling grating 604 on top of the first substrate 601, a first out-coupling grating 606-1 on top of the first substrate 601, and a second out-coupling grating 606-2 at an interface between the first 601 and second 602 substrates. FIG. 6 shows an oblique ray 609 entering the low-index substrate 602 from the high-index substrate 601 at a highly oblique angle of refraction. The highly oblique angle may preclude out-coupling of the ray 609 by the second out-coupling grating 606-2. Such oblique rays, not being split off or replicated, never reach the eyebox, which causes areas of FOV of the image carried by these oblique rays to experience a sharp drop in brightness. In some practical configurations, rays with a refraction angle of over 75 degrees may never be replicated and therefore never reach the eyebox.

Figure 7A:
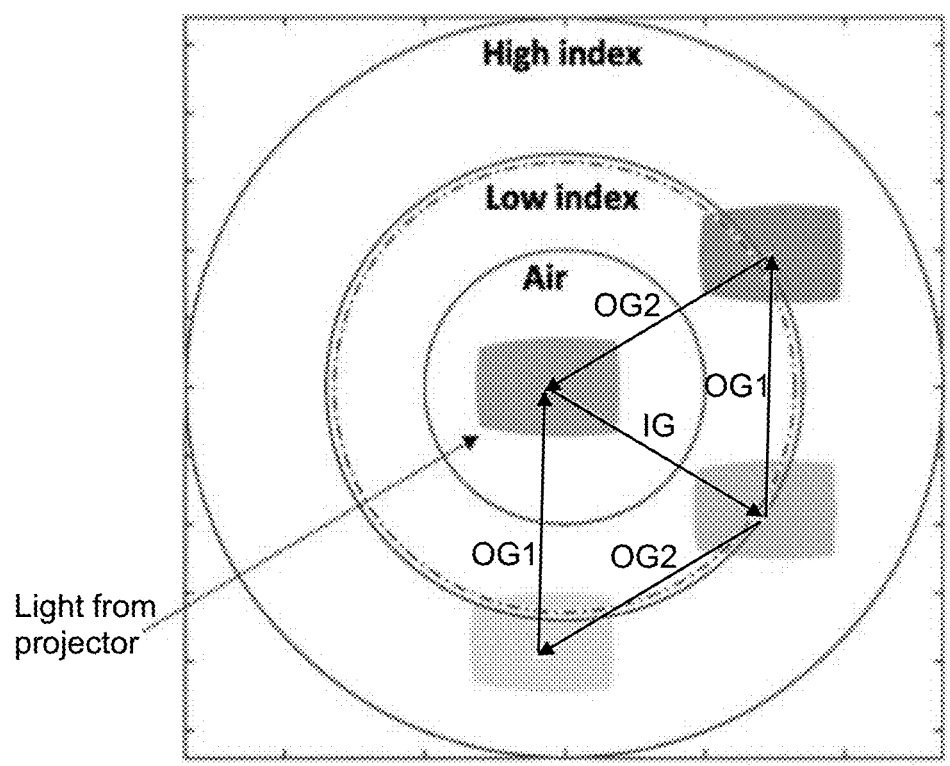
FIG. 7A is a wave-vector plot of the near-eye display of FIG. 1B illustrating the dark band problem.
Figure 7B:
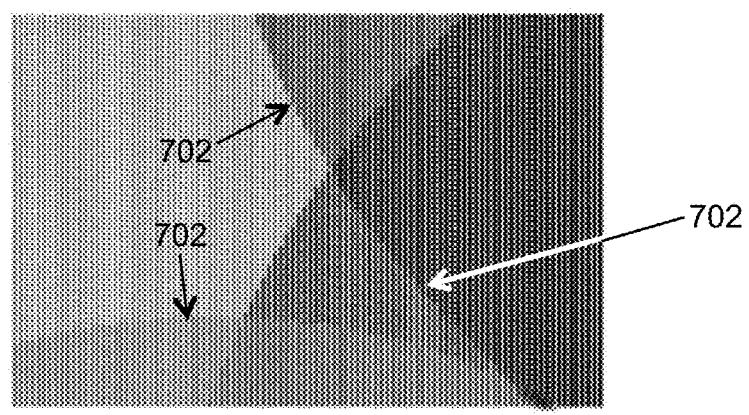
FIG. 7B is a map illustrating locations where dark bands may appear in a dual-substrate waveguide of the near-eye display of FIG. 1B.

The formation of non-uniform illumination areas is further illustrated in a wave-vector diagram of FIG. 7A, which shows an in-coupling grating k-vector IG and out-coupling grating k-vectors OG1 and OG2 corresponding to the oblique ray 609. The first donut 221 corresponds to the first substrate having a high refractive index, and the second donut 222 corresponds to the second substrate having a lower refractive index of 1.7 in this example. The shown K-vectors land proximate the boundary between the first 221 and second 222 donuts, making the corresponding rays oblique rays in the second substrate 602. A map of corresponding typical locations of dark bands in the illumination pattern, or waveguide throughput pattern, is shown in FIG. 7B. The dark bands are shown as boundaries 702 (FIG. 7B), which form cross-shaped patterns similar to the cross-shaped patterns 500 of FIG. 5.

In accordance with this disclosure, illumination non-uniformities due to oblique rays in a low-index substrate at the boundary between high- and low-index substrates may be reduced or lessened by introducing intermediate thick film(s) or layer(s) between the substrates. Waveguides of this disclosure may include two, three, or more substrates, with intermediate layer or layers in between.

Figure 8:
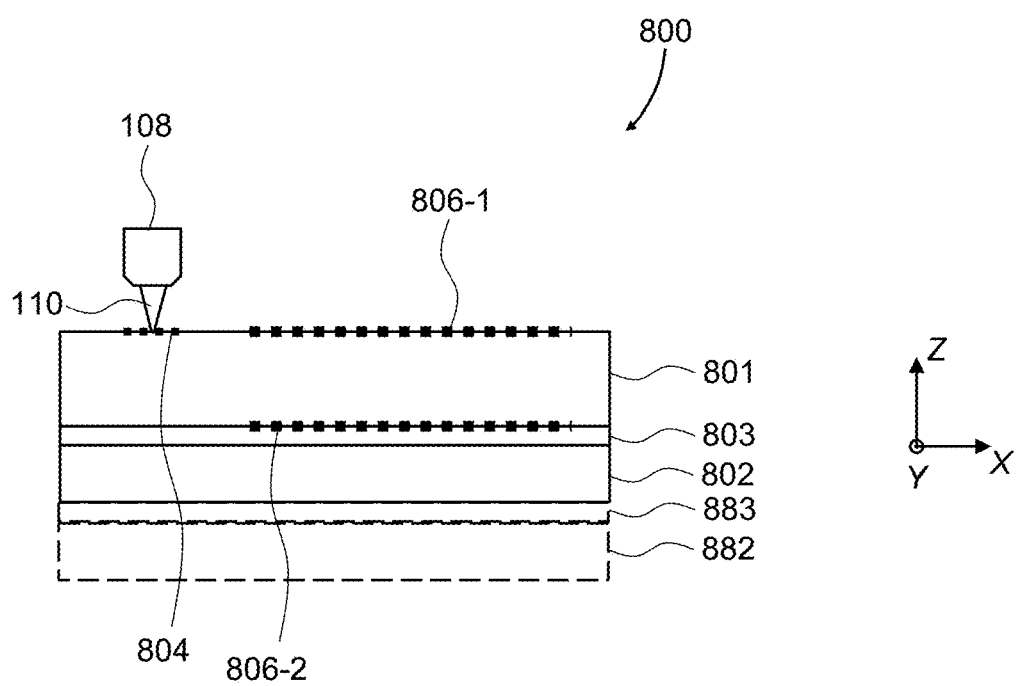
FIG. 8 is a side cross-sectional view of a dual-substrate waveguide including an intermediate layer of a lower refractive index optically coupling the two substrates.

For example, referring to FIG. 8, a pupil-replicating waveguide 800 includes a first substrate 801 having a first refractive index, a second substrate 802 having a second refractive index lower than the first refractive index, and an intermediate layer 803 optically coupling the first 801 and second 802 substrates along length and width dimensions of the first 801 and second 802 substrates. In the embodiment shown, the first 801 and second 802 substrates and the intermediate layer 803 extend parallel to XY plane, such that the length dimension is X-dimension, the width dimension is Y-dimension, and the thickness dimension is Z-dimension. Thus, the intermediate layer 803 couples the first 801 and second 802 substrates along X- and Y-axes. In the embodiment shown, the intermediate layer 803 optically couples the first 801 and second 802 substrates along their entire length and width.

An in-coupling grating 804 may be disposed on the top surface of the first substrate 801 for receiving image light 110 emitted by a projector 108 and in-coupling the image light 110 into the first substrate 801. The first substrate 801 may support at least one out-coupling grating. In FIG. 8, two such gratings are shown, one (806-1) at top, and one (806-2) at the boundary between the first substrate 801 and the intermediate layer 803. The pupil-replicating waveguide 800 spreads the image light 110 coupled by the in-coupling grating 804 in X and Y directions while preserving angular distribution of brightness and color of the image light 110 carrying an image in angular domain. A refractive index of the intermediate layer 803 is lower than the refractive index of the second substrate 802. A thickness of the intermediate layer 803 in Z-direction is less than the thickness of either of the first 801 or second 802 substrates in Z-direction. The thickness of the intermediate layer 803 may be selected to be small enough to prevent zigzag propagation of the image light 110 in the intermediate layer 803, or in other words, to prevent the replication of the image light 110 in the intermediate layer 803. For example, the thickness of the intermediate layer 803 may be less than 10 micrometers, or even less than 5 micrometers. Yet, the intermediate layer 803 should be thick enough to prevent evanescent coupling between the first 801 and second 802 substrates, i.e. to prevent the leaking into the second substrate 802 of a portion of the image light 110 that is totally internally reflected from an interface between the first substrate 801 and the intermediate layer 803 back into the first substrate 801. As a non-limiting example, the thickness of the intermediate layer 803 may be greater than two or three times a wavelength of a red color channel divided by the second refractive index. In some embodiments, the thickness of the intermediate layer 803 may be at least 0.5, 1, 2, 3, 4, or 5 micrometers.

Figure 9A:
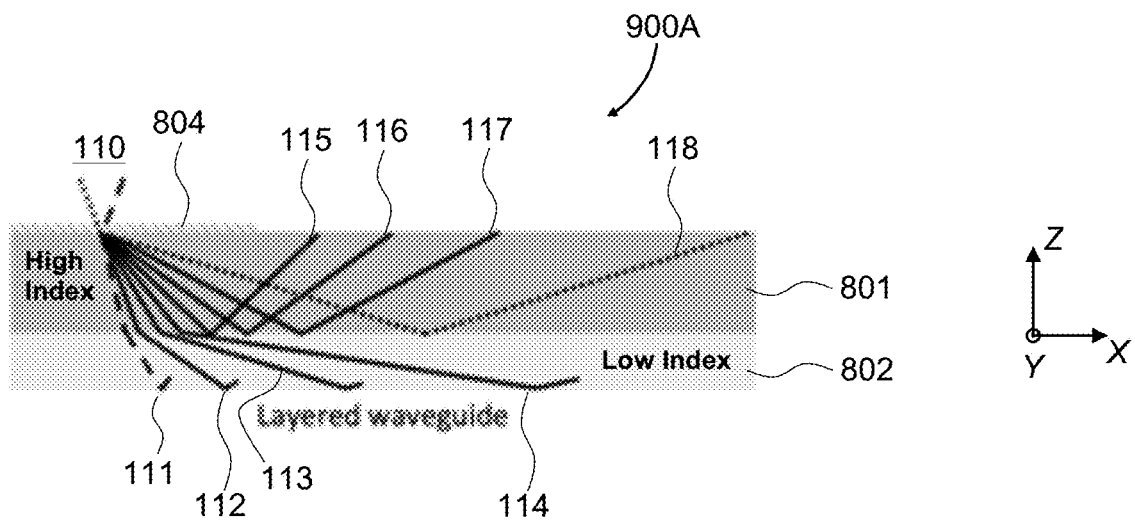
FIGS. 9A and 9B are side cross-sectional views of the waveguides of FIGS. 1B and 8, respectively, showing the difference in the oblique ray propagation between these two waveguides.
Figure 9B:
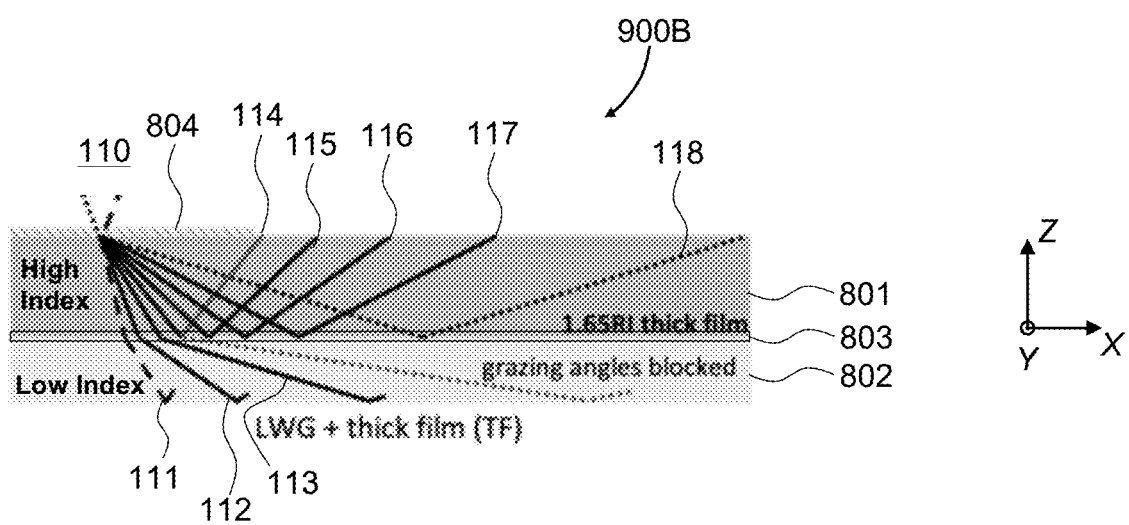

The operation of the pupil-replicating waveguide 800 of FIG. 8 may be illustrated by comparing ray propagation in a dual-substrate waveguide 900A of FIG. 9A that does not have an intermediate layer, and ray propagation in a dual-substrate waveguide 900B of FIG. 9B that does have such a layer, i.e. the intermediate layer 803. Referring first to FIG. 9A, the dual-substrate waveguide 900A is similar to the waveguide 800 of FIG. 8, but does not have any intermediate layer between the first 801 and second 802 substrates. The first 111 to eighth 118 rays (FIG. 9A) are in-coupled into the first substrate 801 by the in-coupling grating 804. The first 111 to fourth 114 rays propagate from the first 801 into the second 802 substrate, while the fifth 115 to eighth 118 rays are totally internally reflected back into the first substrate 801. Upon propagation into the second substrate 802, the first 111 to fourth 114 rays become more oblique, i.e. their angle of refraction at the interface between the fist 801 and second 802 substrates is greater than the angle of incidence at the interface, due to the refractive index of the second substrate 802 (equal to 1.7 in this example) being smaller than the refractive index of the first substrate 801 (equal to 2.7 in this example). The fourth ray 114 propagates at a highly oblique angle, e.g. higher than 75 degrees angle of incidence, and cannot be redirected by out-coupling grating (s) to an eyebox because it is so oblique that it misses the out-coupling grating(s). It is such highly oblique grazing rays that cause a sharp brightness drop at certain angles of FOV of the display, that is, at certain locations in the displayed image in angular domain.

Referring now to FIG. 9B, the dual-substrate waveguide 900B is essentially the same waveguide as the dual-substrate waveguide 800 of FIG. 8, i.e. it does include the intermediate layer 803 between the first 801 and second 802 substrates. The refractive index of the intermediate layer 803 is lower than the refractive index of both substrates 801 and 802. In this example, the refractive index of the intermediate layer 903 is 1.65. The presence of the intermediate layer 803 causes the fourth ray 114 to be totally internally reflected back into the first substrate 801 where the angle of this ray w.r.t. a normal to the interfaces between the layers 801, 803, and 802 (that is, w.r.t. Z-axis) is less oblique, so that the drop of brightness observed in the dual-substrate waveguide 900A of FIG. 9A does not occur in the dual-substrate waveguide 900B of FIG. 9B, or at least the drop is greatly lessened. Thus, the function of the intermediate layer 803 is to suppress highly oblique rays in the second substrate 802. The suppression of highly oblique rays reduces brightness drops in FOV portions carried by the highly oblique rays and thus improves brightness uniformity. In some embodiments, the refractive index of the intermediate layer 803 is no greater than the second refractive index multiplied by) $\sin(75°)$, ensuring that the first 111, second 112, and third 113 rays propagated into the second substrate 802 have an angle not exceeding 75 degrees, that is, are not highly oblique rays.

More substrates may be added to a waveguide in this manner. Referring back to FIG. 8, the pupil-replicating waveguide 800 may further include a third substrate 882 having a third thickness and a third refractive index, and another (second) intermediate layer 883 between the second 802 and third 882 substrates. The second intermediate layer 883 has a refractive index lower than the refractive indices of the second 802 and third 882 substrates. The second intermediate layer 883 optically couples the second 802 and third 882 substrates along length and width dimensions of the second 802 and third 882 substrates. A thickness of the second intermediate layer 883 is less than the thickness of the first 801, second 802, and third 882 substrates. More generally, the thickness ranges and the refractive index limitations of the second intermediate layer 883 may be similar to those for the intermediate layer 803 coupling the first 801 and second 102 substrates. Furthermore in some embodiments, the third substrate 882 may be coupled not to the second 802 but to the first substrate 801 by the second intermediate layer 883. More than three substrates may be coupled by respective intermediate layers.

In some embodiments, the intermediate layer 803 may include a birefringent film such as, for example, a polymer-dispersed liquid crystal film with liquid crystal molecules oriented predominantly in one direction defining an extraordinary axis (e-axis) of the film. A dual-substrate waveguide 1000 of FIGS. 10A and 10B includes an intermediate layer 1003, e.g. a birefringent film, between first (high-index) 1001 and second (low-index) 1002 substrates. The intermediate layer 1003 optically couples the first 1001 and second 1002 substrates in a plane of the intermediate layer 1003, i.e. in XY plane. In this example, the first substrate 1001 has the refractive index of 2.7, the second substrate 1002 has the refractive index of 1.7, and the intermediate layer 1003 has an effective refractive index for p-polarized light of 1.65, and an effective refractive index for s-polarized light of 1.5. In this example, p-polarized light is polarized in XZ plane, and s-polarized light is light polarized in XY plane.

Figure 10A:
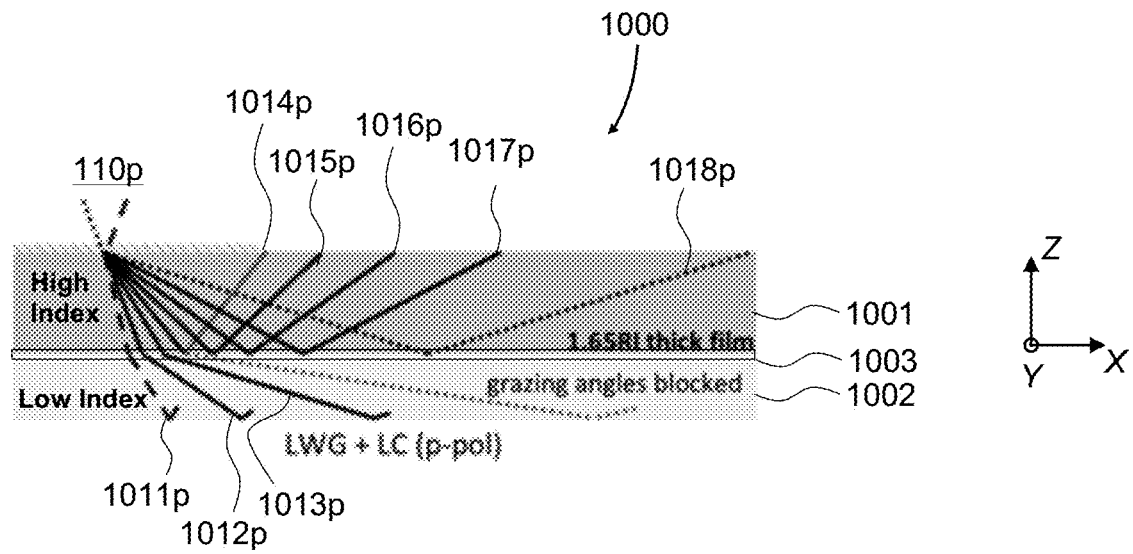
FIGS. 10A and 10B are side cross-sectional views of an embodiment of the waveguide of FIG. 8 with a birefringent intermediate layer showing the rays propagation for light at two orthogonal polarizations.

Referring specifically to FIG. 10A, the propagation of the first 1011p to eighth 1018p p-polarized rays of light 110p is similar to propagation of the first 111 to eighth 118 rays in the waveguide 900B of FIG. 9B, because the refractive index map of these two waveguides is essentially the same for p-polarized light. The presence of the intermediate layer 1003 causes the fourth ray 1014p to be totally internally reflected back into the first substrate 1001 which, as explained above, reduces the brightness variations across the FOV of the display.

Figure 10B:
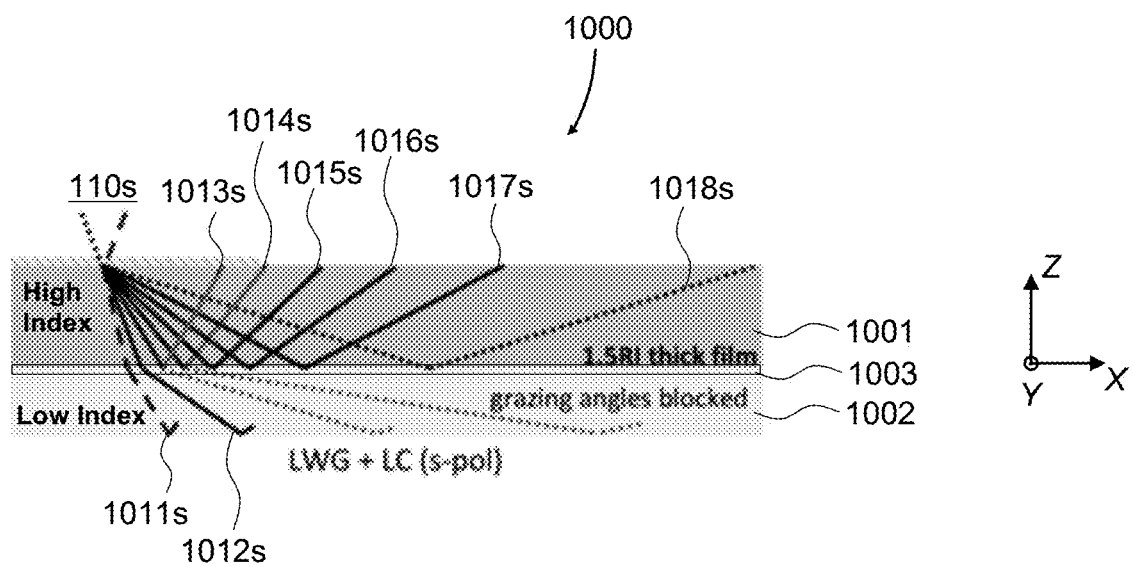

Turning now to FIG. 10B, the refractive index of the intermediate layer 1003 for s-polarized light is 1.5, which is lower than 1.65 and, accordingly, the refractive index difference between the first layer 1001 and the intermediate layer 1003 is even greater for s-polarized light than for p-polarized light. The greater refractive index difference causes not just a fourth ray 1014s but also a third ray 1013s, having a less oblique angle of incidence at the interface between the first substrate 1001 and the intermediate layer 1003 than the fourth ray 1014s, to be totally internally reflected back into the first substrate 1001. The two critical angles for the two polarizations of light can facilitate further improvement of the illumination uniformity of a dual-substrate waveguide. In some embodiments, a first polarization refractive index of the birefringent film is smaller than or equal to the refractive index of the lower-index substrate (second substrate) multiplied by sin(75 degrees), and a second polarization refractive index of the birefringent film is between the refractive index multiplied by sin(60 degrees) and the refractive index of the second substrate multiplied by sin(75 degrees). The first and second polarizations are orthogonal polarizations, e.g. linear polarizations in XZ and XY planes considered above with reference to FIGS. 10A and 10B.

Figure 11A:
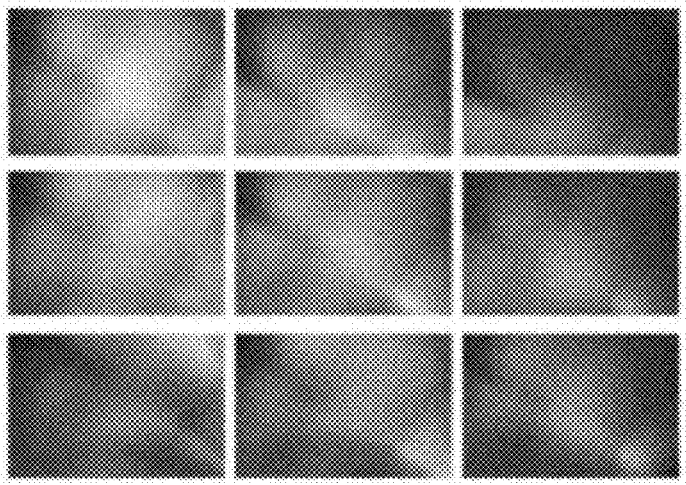
FIGS. 11A and 11B are sets of red, green, and blue color channel illumination maps of the waveguide of FIG. 8 with a birefringent intermediate layer at nine different eyebox locations, the maps corresponding to ordinary/extraordinary refractive indices of the birefringent intermediate layer equal to 1.5/1.7 (FIG. 11A) and 1.5/1.65.
Figure 11A:
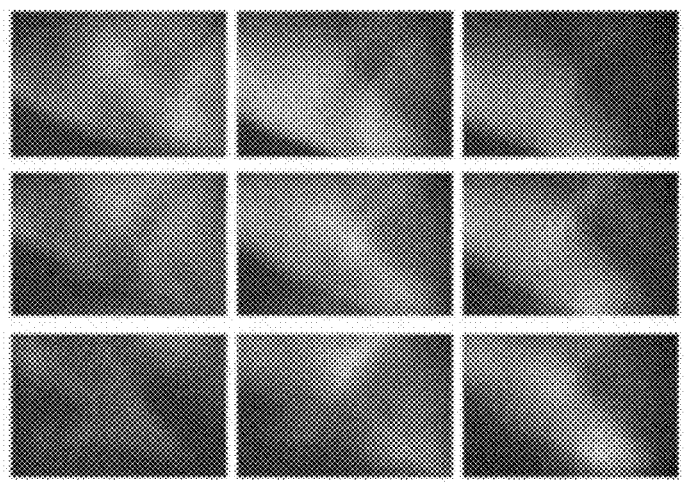
Figure 11A:
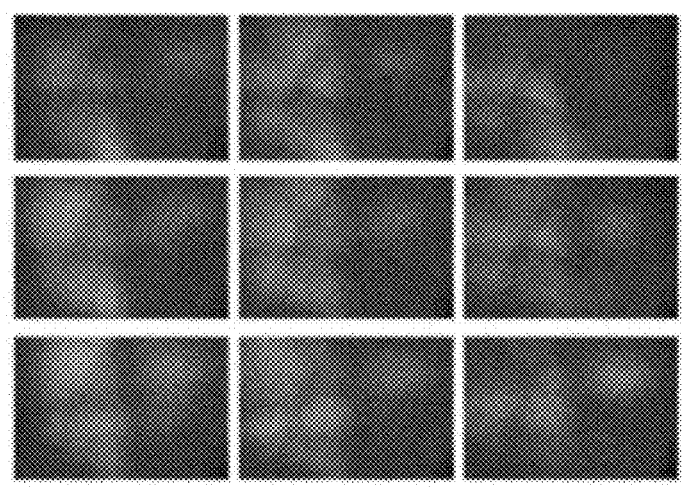
Figure 11B:
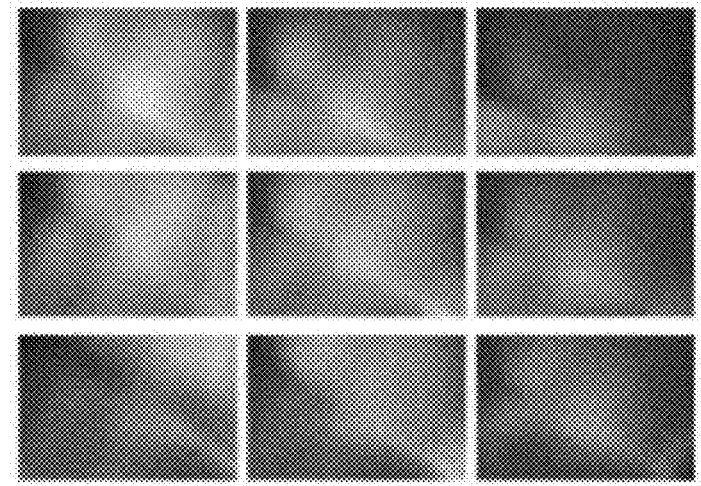
Figure 11B:
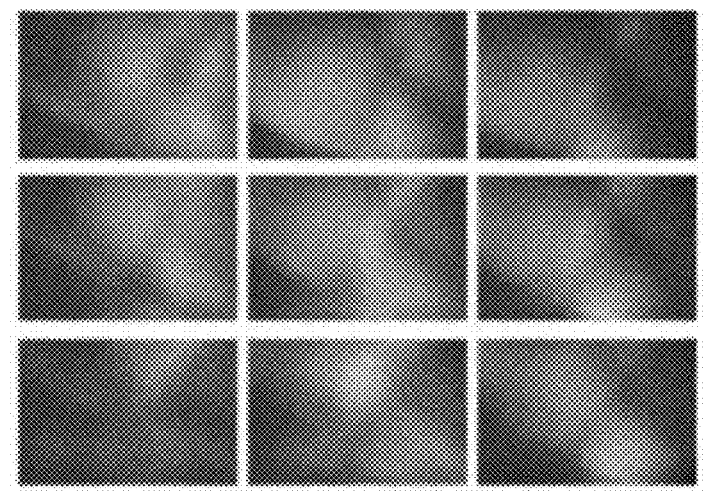
Figure 11B:
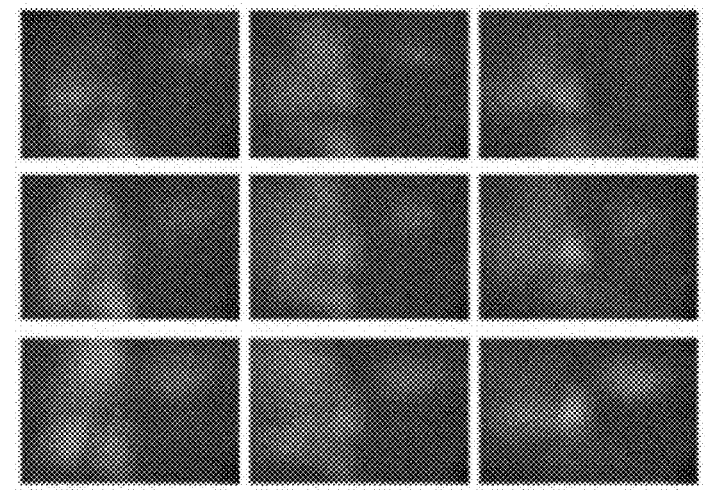

Uniformity of waveguides with an intermediate layer is further illustrated in FIGS. 11A and 11B. Referring first to FIG. 11A with further reference to FIG. 5 for comparison, a set of illumination maps at nine different eye pupil locations in the eyebox is presented for each of red (R), green (G), and blue (B) color channels of the image light replicated by the dual-substrate waveguide 800 of FIG. 8 with a birefringent layer in place of the intermediate layer 803. The birefringent intermediate layer may be e.g. an anisotropic liquid crystal (LC) film. In this embodiment, the anisotropic LC film has ordinary refractive index of 1.5 and extraordinary refractive index of 1.7. One can see by comparing FIG. 11A to FIG. 5 that the cross-shaped patterns 500 (FIG. 5) have been significantly suppressed in the maps of FIG. 11A.

FIG. 11B shows a set of illumination maps at the same nine locations for red, green and blue color channels for the case of a dual-substrate waveguide with a birefringent intermediate layer including an anisotropic LC film having ordinary refractive index of 1.5 and extraordinary refractive index of 1.65. One can see that the presence of birefringent intermediate layers facilitates a considerable improvement of illumination uniformity.

Figure 12:
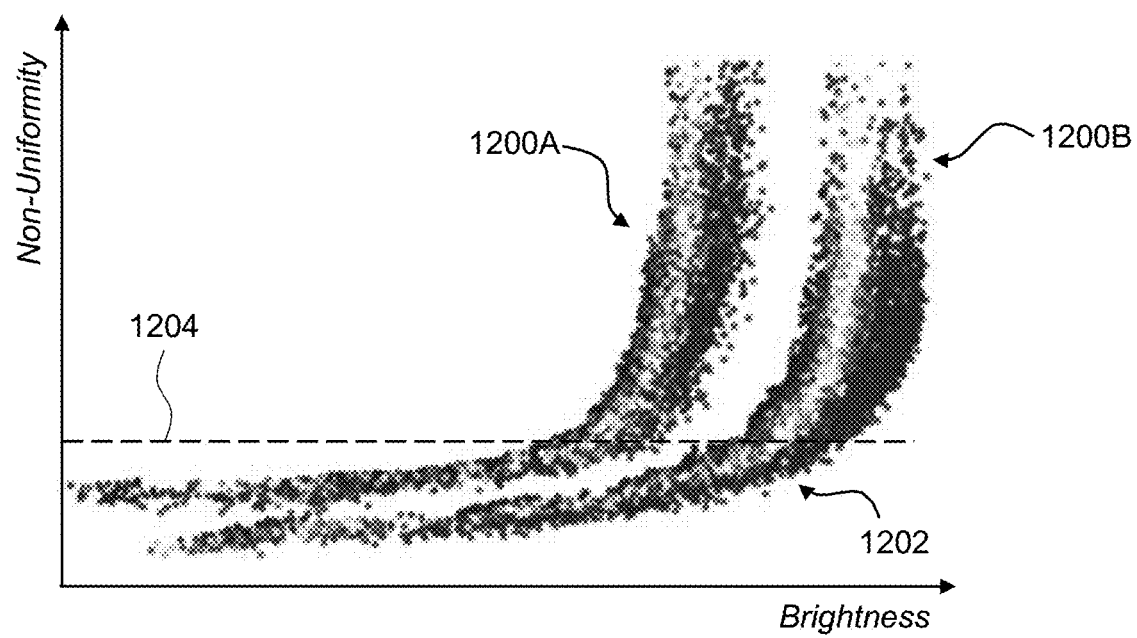
FIG. 12 is a combined plot of illumination non-uniformity vs. display brightness for the near-eye displays of FIG. 1B and FIG. 8.

The improvement achieved by the introduction of an intermediate layer between substrates of a two-substrate waveguide is further illustrated in FIG. 12 where a brightness non-uniformity is plotted against brightness for the waveguide 900A of FIG. 9A (a plurality of dots 1200A) and for the waveguide 900B of FIG. 9B (a plurality of dots at 1200B). Each dot in the graphs of FIG. 12 corresponds to a particular configuration of waveguide and gratings. From the viewpoint of waveguide optimization, it is desirable to increase the image brightness, i.e. move to the right in the graph of FIG. 12, while reducing the non-uniformity of the brightness, i.e. remaining low vertically in FIG. 12. One can see by comparing the pluralities of dots 1200A and 1200B that introduction of the low-index intermediate layer optically coupling waveguide substrates enables one to further increase the overall brightness of the displayed image, e.g. to a level indicated at 1202, while keeping the non-uniformity below a threshold level 1204.

Figure 13:
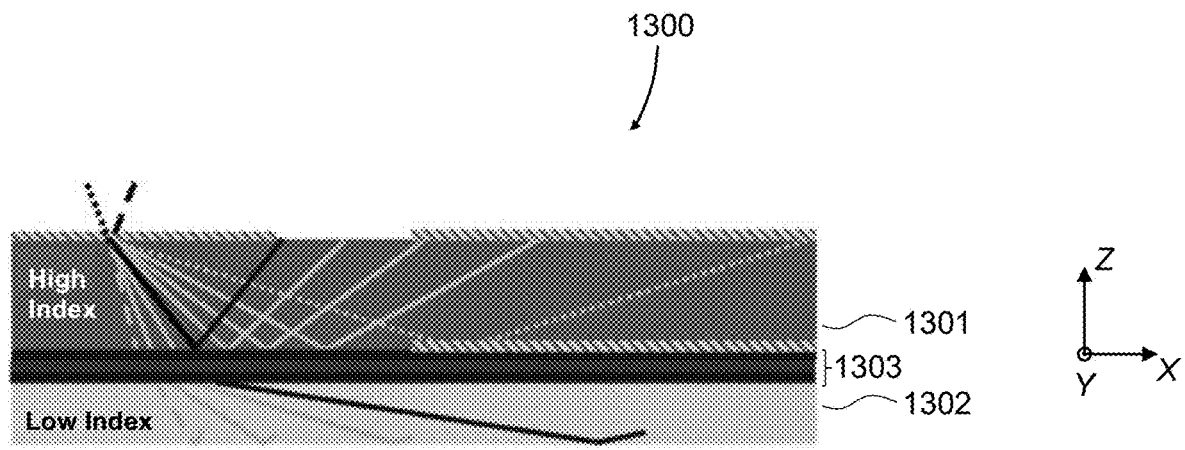
FIG. 13 is a side cross-sectional view of an embodiment of the waveguide of FIG. 8 including a reflective coating in place of the intermediate layer.

FIG. 13 illustrates an embodiment of a pupil-replicating waveguide where the intermediate layer is configured to provide a pre-determined reflectivity vs. incidence angle, e.g. where the intermediate layer is a single- or multilayer dielectric reflector film.

Figure 14A:
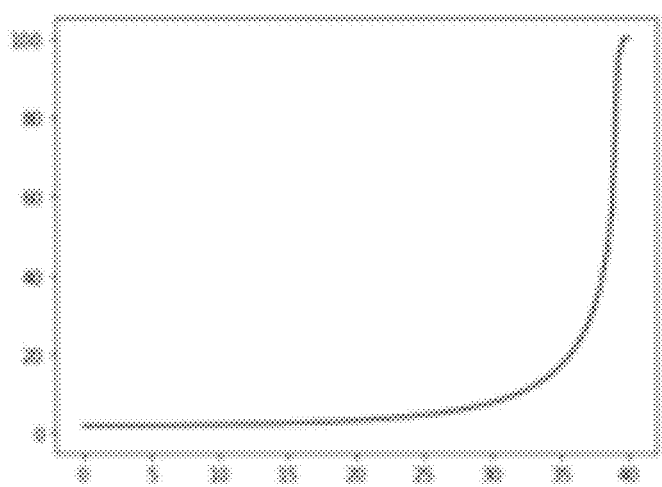
FIGS. 14A, 14B, and 14C are spectral reflectivity plots of a single-layer variant of the reflective coating of FIG. 13 for red, green, and blue light respectively.
Figure 14B:
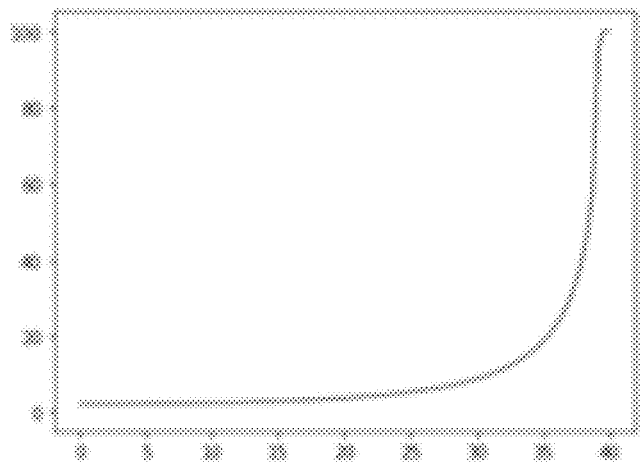
Figure 14C:
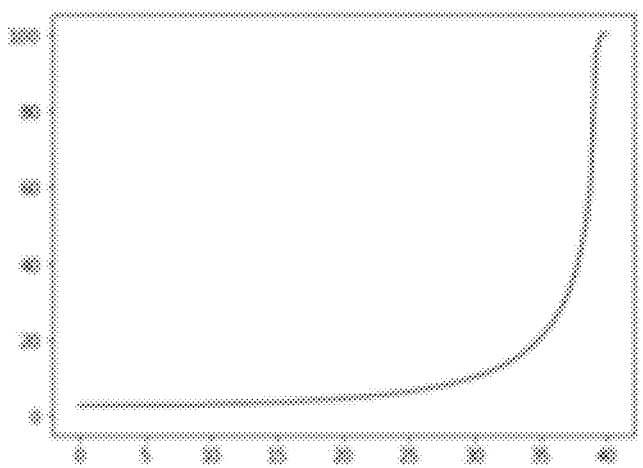
Figure 15A:
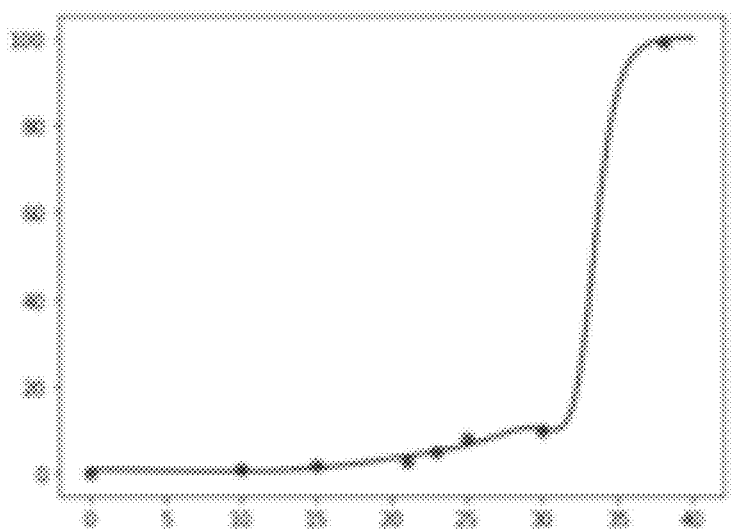
FIGS. 15A, 15B, and 15C are spectral reflectivity plots of a five-layer variant of the reflective coating of FIG. 13 for red, green, and blue light respectively.
Figure 15B:
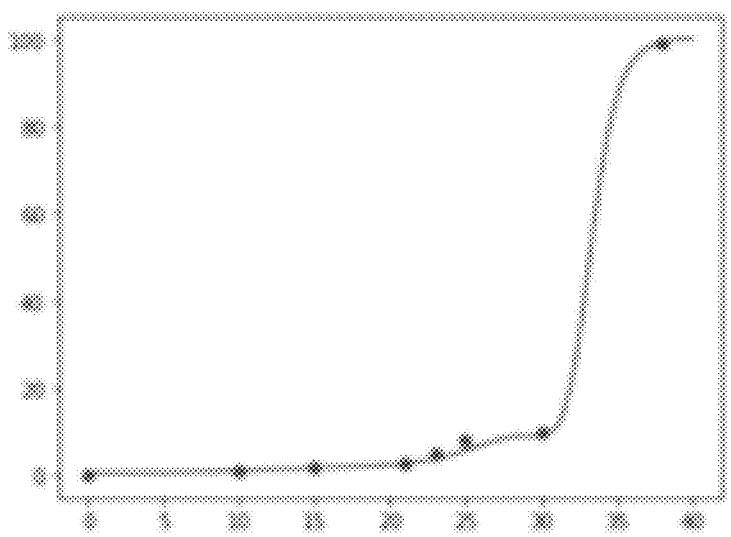
Figure 15C:
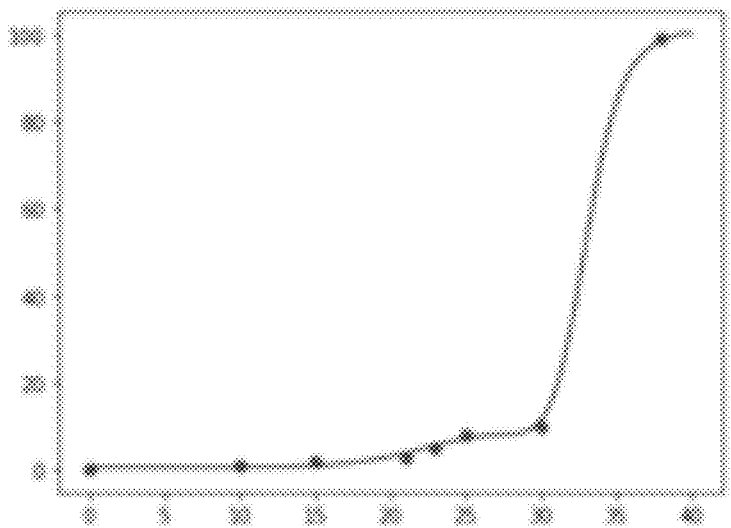
Figure 16A:
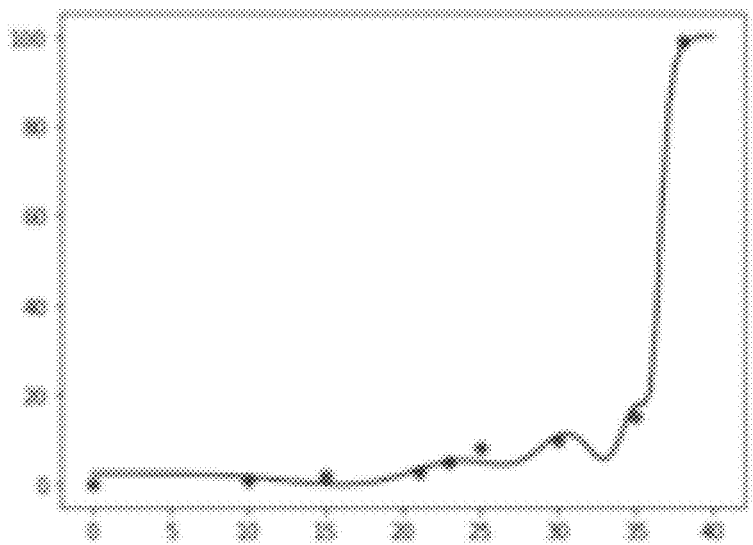
FIGS. 16A, 16B, and 16C are spectral reflectivity plots of another five-layer reflective coating embodiment for red, green, and blue light respectively.
Figure 16B:
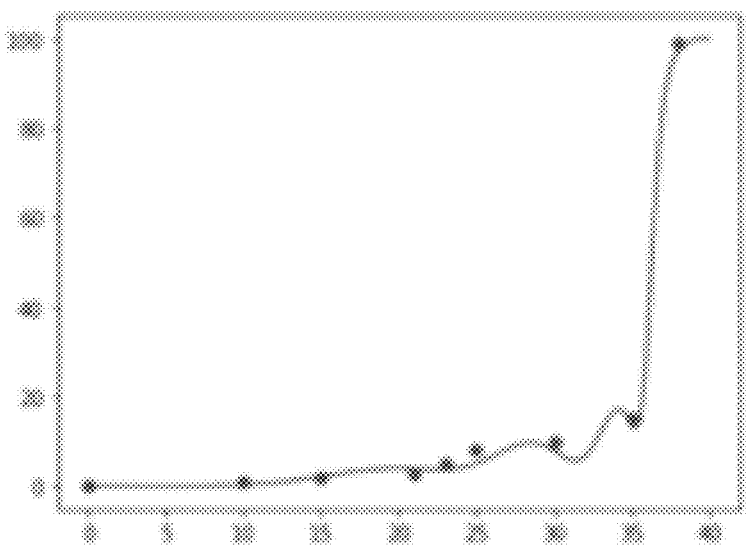
Figure 16C:
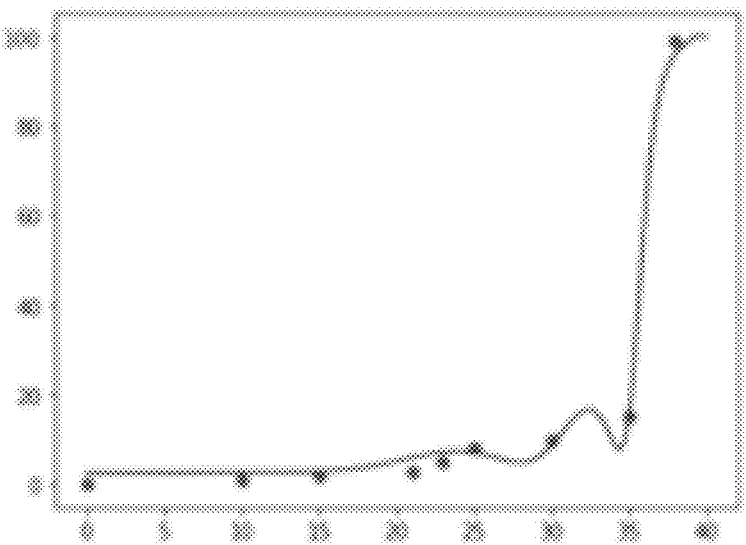

A waveguide 1300 of FIG. 13 includes first (high-index; 1301) and second low-index; 1302) substrates optically coupled by a dielectric reflector film 1303. Spectral reflectivity plots for the case of a one-layer custom reflective film are shown in FIGS. 14A (blue color channel), 14B (green color channel), and 14C (red color channel). Spectral reflectivity plots for the case of a five-layer film are shown in FIGS. 15A (blue color channel), 15B (green color channel), and 15C (red color channel). FIGS. 16A, 16B, and 16C show similar plots for another embodiment of a five-layer film optically coupling the two substrates. In the single-layer reflective films of FIGS. 14A-14C and five-layer reflective films of FIGS. 15A-15C and 16A-16C, the refractive indices of the layers are between 1.3 and 2.0, and the thicknesses of the layers are between 20 nm and 200 nm.

In some embodiments, the multilayer dielectric film 1303 may be configured to reflect rays of visible light propagating from the first substrate 1301 into the second substrate 1302 at angles of incidence at the multilayer dielectric film 1303 greater than some threshold angle, e.g. 30 degrees, 35 degrees, 40 degrees, or 45 degrees in the high-index substrate, i.e. the first substrate 1301. More generally, the dielectric film 1303 may be replaced with an optical coating such as, for example, a single- or multi-layer dielectric coating, a metallic coating, and/or a nano-structured coating.

Figure 17A:
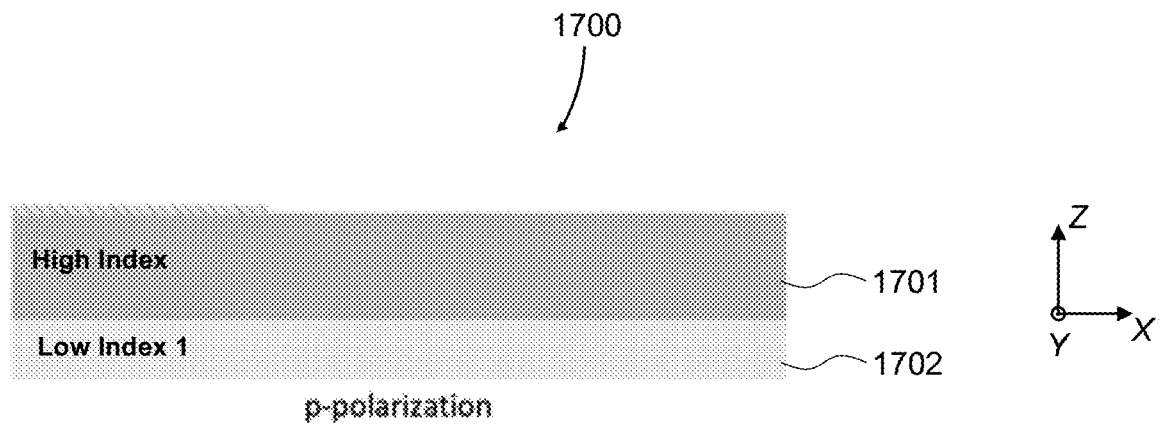
FIGS. 17A and 17B are side cross-sectional views of a dual substrate embodiment including a birefringent substrate corresponding to p- and s-polarized light, respectively.
Figure 17B:
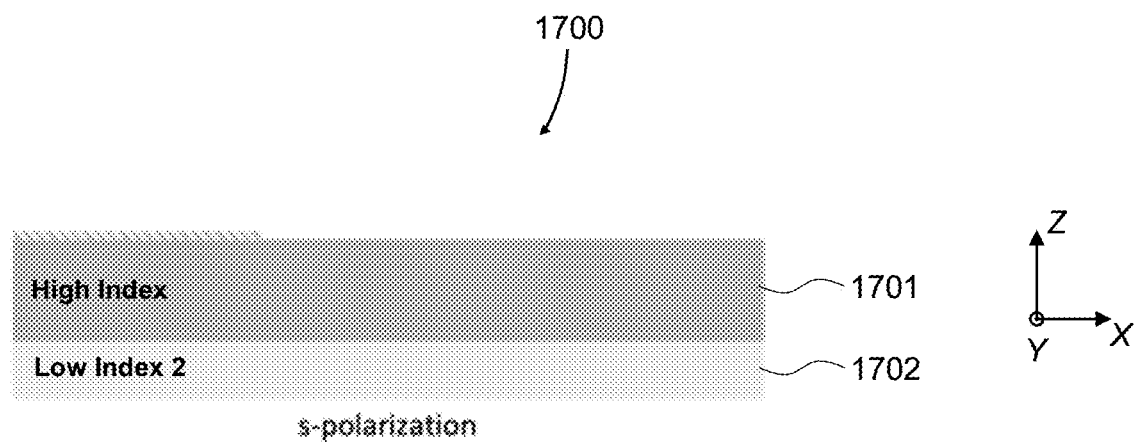

Referring now to FIGS. 17A and 17B, a pupil-replicating waveguide 1700 includes a first substrate 1701 having a first refractive index ("High Index") and a second substrate 1702 comprising a birefringent material having both the ordinary and extraordinary refractive indices less than the first refractive index. The first 1701 and second 1702 substrates are optically coupled along length and width dimensions of the substrates, i.e. along X- and Y-axes. In the example of FIG. 17A, the image light is p-polarized, and the effective refractive index of the second substrate ("Low Index 1") is 1.7. In the example of FIG. 17B, the image light is s-polarized, and the effective refractive index of the second substrate ("Low Index 2") is 1.5. The optic axis of the birefringent material may be parallel to the second substrate 1702, i.e. it may be disposed in the XY plane. For example, a stretched birefringent film, or an LC film may have its optic axis parallel to the XY plane. In some embodiments, the optic axis of the birefringent material forms a non-zero angle with the substrate plane, i.e. with the XY plane.

The pupil-replicating waveguide 800 of FIG. 8, the pupil-replicating waveguide 900A of FIG. 9A, the pupil-replicating waveguide 900B of FIG. 9B, the pupil-replicating waveguide 1000 of FIGS. 10A and 10B, and the pupil-replicating waveguide 1300 of FIG. 13 may be manufactured by bonding the substrates of the waveguide to one another, forming a stack. The intermediate layers preventing oblique rays of the image light in the second (i.e. lower-index) substrates may be deposited onto the first and/or second substrates, or may be bonded to the substrate(s), as explained above with reference to FIG. 3.

Figure 18:
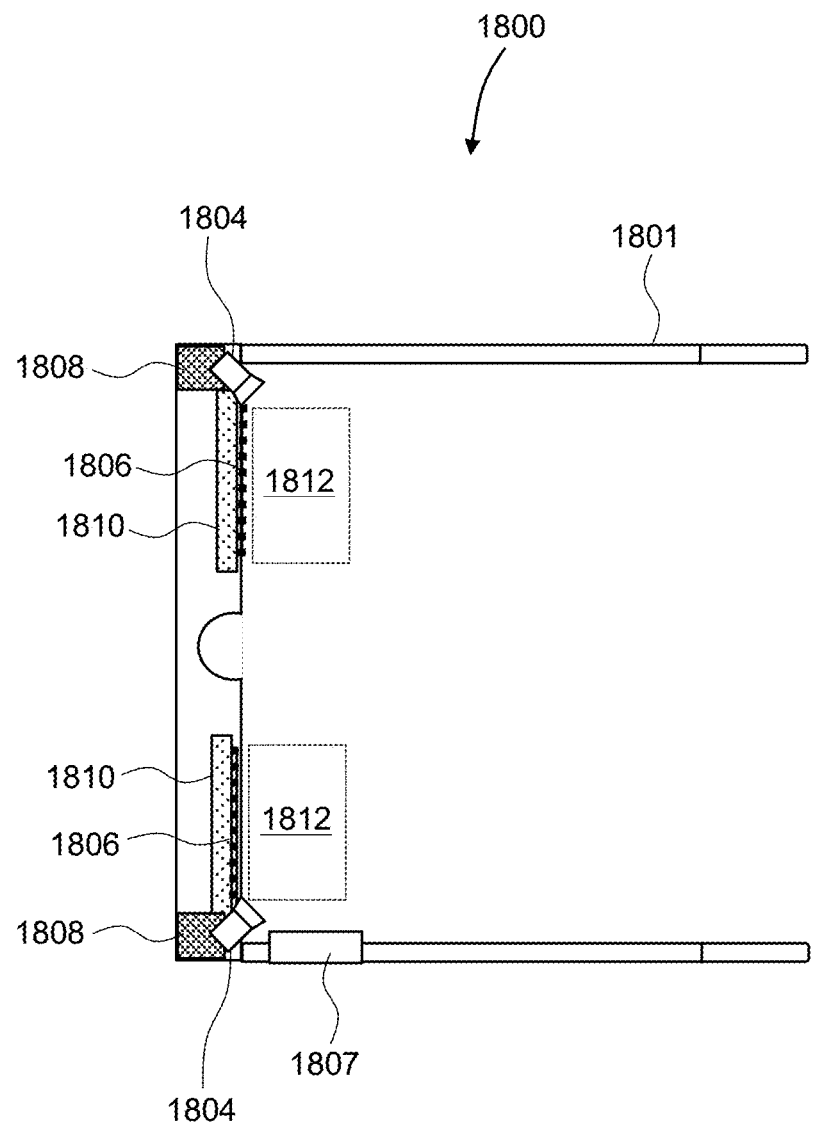
FIG. 18 is a view of an augmented reality (AR) near-eye display including waveguides of this disclosure, the display having a form factor of a pair of eyeglasses.

Turning to FIG. 18, a near-eye display 1800 may have a frame 1801 having a form factor of a pair of eyeglasses. The frame 1801 supports, for each eye: a projector 1808 including an output pupil for providing image light carrying an image in angular domain, and a pupil-replicating waveguide 1810 optically coupled to the projector 1808 for replicating the projector's output pupil by providing multiple portions of the image light offset relative to one another in at least one of length or width directions of the pupil-replicating waveguide. The pupil-replicating waveguide 1810 may include any of the waveguides disclosed herein.

The near-eye display 1800 may further include, for each eye, an eye-tracking camera 1804, a plurality of illuminators 1806. The near-eye display 1800 may further include an eye-tracking camera controller 1807. The illuminators 1806 may be supported by the pupil-replicating waveguide 1810 for illuminating an eyebox 1812. The projector 1808 provides a fan of light beams carrying an image in angular domain to be projected into a user's eye. The pupil-replicating waveguide 1810 receives the fan of light beams and provides multiple laterally offset parallel copies of each beam of the fan of light beams, thereby extending the projected image over the eyebox 1812.

For AR applications, the pupil-replicating waveguide 1810 can be transparent or translucent to enable the user to view the outside world together with the images projected into each eye and superimposed with the outside world view. The images projected into each eye may include objects disposed with a simulated parallax, so as to appear immersed into the real world view.

The purpose of the eye-tracking cameras 1804 is to determine position and/or orientation of both eyes of the user. Once the position and orientation of the user's eyes are known, a gaze convergence distance and direction may be determined. The imagery displayed by the projectors 1808 may be adjusted dynamically to account for the user's gaze, for a better fidelity of immersion of the user into the displayed augmented reality scenery, and/or to provide specific functions of interaction with the augmented reality. In operation, the illuminators 1806 illuminate the eyes at the corresponding eyeboxes 1812, to enable the eye-tracking cameras to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 1812.

The function of the eye-tracking camera controllers 1807 is to process images obtained by the eye-tracking cameras 1804 to determine, in real time, the eye gazing directions of both eyes of the user. In some embodiments, the image processing and eye position/orientation determination functions may be performed by a central controller, not shown, of the AR near-eye display 1800. The central controller may also provide control signals to the projectors 1808 to generate the images to be displayed to the user, depending on the determined eye positions, eye orientations, gaze directions, eyes vergence, etc.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A pupil-replicating waveguide comprising:
    a first substrate having a first thickness and a first refractive index;
    a second substrate having a second thickness and a second refractive index lower than the first refractive index; and
    a first intermediate layer between the first and second substrates, wherein:
    the first intermediate layer optically couples the first and second substrates along length and width dimensions of the first and second substrates, so as to suppress coupling of highly oblique rays of light propagating in the first substrate by internal reflections into the second substrate to propagate therein by internal reflections;
    a thickness of the first intermediate layer is smaller than the first and second thickness; and
    a refractive index of the first intermediate layer is lower than the second refractive index.

2. The pupil-replicating waveguide of claim 1, wherein the thickness of the first intermediate layer is small enough to prevent zigzag light propagation in the first intermediate layer.

3. The pupil-replicating waveguide of claim 1, wherein the thickness of the first intermediate layer is less than 10 micrometers.

4. The pupil-replicating waveguide of claim 1, wherein the thickness of the first intermediate layer is big enough to prevent evanescent coupling between the first and second substrates.

5. The pupil-replicating waveguide of claim 1, wherein the thickness of the first intermediate layer is greater than two times a wavelength of a red color channel divided by the second refractive index.

6. The pupil-replicating waveguide of claim 1, wherein the thickness of the first intermediate layer is at least 0.5 micrometers.

7. The pupil-replicating waveguide of claim 1, wherein the refractive index of the first intermediate layer is no greater than the second refractive index multiplied by)sin (75°) .

8. The pupil-replicating waveguide of claim 1, wherein the first intermediate layer comprises a birefringent film comprising a first polarization refractive index for light at a first polarization and a second polarization refractive index for light at a second polarization, wherein the first and second polarizations are orthogonal to each other.

9. The pupil-replicating waveguide of claim 8, wherein the first polarization refractive index is no greater than the second refractive index multiplied by)sin(75°), and the second polarization refractive index is between the second refractive index multiplied by)sin(60°) and the second refractive index multiplied by)sin(75°).

10. The pupil-replicating waveguide of claim 1, wherein the first intermediate layer comprises a multilayer dielectric film.

11. The pupil-replicating waveguide of claim 10, wherein the multilayer dielectric film is configured to reflect rays of visible light propagating from the first substrate into the second substrate at angles of incidence at the multilayer dielectric film greater than 30 degrees.

12. The pupil-replicating waveguide of claim 1, wherein the first substrate, the first intermediate layer, and the second substrate are bonded to one another, forming a stack.

13. The pupil-replicating waveguide of claim 1, further comprising:
an in-coupling grating supported by the first substrate; and
an out-coupling grating supported by the first substrate.

14. The pupil-replicating waveguide of claim 1, further comprising:
a third substrate having a third thickness and a third refractive index; and
a second intermediate layer between the second and third substrates, the second intermediate layer having a refractive index lower than the second and third refractive indices, wherein the second intermediate layer optically couples the second and third substrates along length and width dimensions of the second and third substrates, and wherein a thickness of the second intermediate layer is less than the thickness of the first, second, and third substrates.

15. A pupil-replicating waveguide comprising:
a first substrate having a first refractive index; and
a second substrate comprising a birefringent material having both ordinary and extraordinary refractive indices smaller than the first refractive index, wherein the first and second substrates are optically coupled along length and width dimensions of the first and second substrates.

16. The pupil-replicating waveguide of claim 15, wherein an optic axis of the birefringent material is parallel to the second substrate.

17. The pupil-replicating waveguide of claim 15, wherein the first and second substrates are bonded to each other, forming a stack.

18. A near-eye display comprising:
a projector comprising an output pupil for providing image light carrying an image in angular domain; and
a pupil-replicating waveguide optically coupled to the projector for replicating the output pupil by providing multiple portions of the image light offset relative to one another in at least one of length or width dimensions of the pupil-replicating waveguide, wherein the pupil-replicating waveguide comprises:
a first substrate having a first thickness and a first refractive index;
a second substrate having a second thickness and a second refractive index lower than the first refractive index; and
an intermediate layer between the first and second substrates, wherein:
the intermediate layer optically couples the first and second substrates along length and width dimensions of the first and second substrates, so as to suppress coupling of highly oblique rays of the image light propagating in the first substrate by internal reflections into the second substrate to propagate therein by internal reflections;
a thickness of the intermediate layer is smaller than the first and second thickness; and
a refractive index of the intermediate layer is lower than the second refractive index.

19. The near-eye display of claim 18, wherein the thickness of the intermediate layer is small enough to prevent zigzag light propagation in the intermediate layer.

20. The near-eye display of claim 18, wherein the thickness of the intermediate layer is big enough to prevent evanescent coupling between the first and second substrates.

* * * * *